United States Patent
Doerr

(10) Patent No.: US 8,768,110 B2
(45) Date of Patent: Jul. 1, 2014

(54) OPTICAL ISOLATOR USING PHASE MODULATORS

(75) Inventor: Christopher R. Doerr, Middletown, NJ (US)

(73) Assignee: Alcatel Lucent, Paris (FR)

( * ) Notice: Subject to any disclaimer, the term of this patent is extended or adjusted under 35 U.S.C. 154(b) by 455 days.

(21) Appl. No.: 13/151,786

(22) Filed: Jun. 2, 2011

(65) Prior Publication Data

US 2012/0308175 A1 Dec. 6, 2012

(51) Int. Cl.
- *G02F 1/035* (2006.01)
- *G02B 26/00* (2006.01)
- *H01S 3/10* (2006.01)

(52) U.S. Cl.
USPC ............ 385/3; 385/1; 385/2; 385/11; 385/14; 385/15; 385/122; 385/129; 385/130; 385/131; 385/132; 359/237; 359/238; 372/27; 372/28; 372/703

(58) Field of Classification Search
None
See application file for complete search history.

(56) References Cited

U.S. PATENT DOCUMENTS

| | | | | |
|---|---|---|---|---|
| 5,448,396 | A | * | 9/1995 | Fukushima .................... 359/257 |
| 6,947,619 | B2 | * | 9/2005 | Fujita et al. ..................... 385/11 |
| 7,228,023 | B1 | * | 6/2007 | Jones ............................... 385/14 |
| 2008/0008475 | A1 | * | 1/2008 | Barbarossa et al. ............ 398/85 |
| 2013/0209022 | A1 | * | 8/2013 | Doerr ................................ 385/3 |

* cited by examiner

*Primary Examiner* — Ryan Lepisto
*Assistant Examiner* — Guy Anderson
(74) *Attorney, Agent, or Firm* — Kramer & Amado, P.C.

(57) ABSTRACT

Various exemplary embodiments relate to an optical isolator in an integrated optical circuit including: a first optical modulator configured to provide a first periodic phase modulation on an input optical signal; a second optical modulator configured to provide a second periodic phase modulation on the modulated optical signal; and an optical waveguide having a length L connecting the first optical modulator to the second optical modulator; wherein the phase difference between the first and second periodic phase modulation is $\pi/2$, and wherein the length L of the optical waveguide causes a phase delay of $\pi/2$ on an optical signal traversing the optical waveguide.

20 Claims, 2 Drawing Sheets

OPTICAL ISOLATOR USING PHASE MODULATORS

TECHNICAL FIELD

Various exemplary embodiments disclosed herein relate generally to optical isolators using phase modulators.

BACKGROUND

Great advances are being made in optical processing of optical signals. This is leading to the development of integrated optical circuits. Some integrated optical circuits use continuous wave lasers. Optical isolators may be used to prevent reflections back to the continuous wave laser. Reflections back to the continuous wave laser may degrade its performance.

SUMMARY

It may be desirable to monolithically integrate a continuous wave (CW) laser with other optical circuit elements. Further, it may be desirable to have an optical isolator to prevent reflections back into the CW laser. Reflections may cause mode instability, chirping, noise, etc. in the CW laser.

In discrete optics, high-quality isolators are commercially available that use the Faraday effect. However, to the knowledge of the inventor, to date, no one has demonstrated practical integration into integrated optical circuits of an isolator based on the Faraday effect. The reported results typically have high insertion loss, and the isolation is typically poor. There have been proposed solutions using modulators, but these are typically using either amplitude modulators as gates, which require the isolated signal to consist of pulses or using multimode waveguides with a traveling-wave modulator on one side of the waveguide, which is impractical with today's technology.

There is a need for an optical isolator for use in integrated optical circuits that results in low signal loss and that provides sufficient rejection of reflections back towards a CW laser.

In light of the present need for an optical isolator for use in integrated optical circuits, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various exemplary embodiments provide an optical waveguide coupler including: an optical isolator for use in an integrated optical circuit including: a first optical modulator configured to provide a first periodic phase modulation on an input optical signal; a second optical modulator configured to provide a second periodic phase modulation on the modulated optical signal; and an optical waveguide having a length L connecting the first optical modulator to the second optical modulator; wherein the phase difference between the first and second periodic phase modulation is $\pi/2$, and wherein in use the length L of the optical waveguide causes a phase delay of $\pi/2$ on an optical signal traversing the optical waveguide.

Various exemplary embodiments further provide a method of isolating the output of a laser source including: optically phase modulating the output of the laser source with a first periodic phase modulation; transmitting the optically phase modulated signal on an optical waveguide that phase delays the optically phase modulated signal by $\pi/2$; optically phase modulating the transmitted optically phase modulated signal with a second periodic phase modulation wherein the phase difference between the first and second periodic phase modulation is $\pi/2$.

Various exemplary embodiments relate to an optical isolator for use in an integrated optical circuit, including: a first optical modulator having a first input/output port, a second input/output port, and a modulation port; a first periodic source providing a first periodic modulation signal to the modulation port of the first optical modulator; a second optical modulator having a first input/output port, a second input/output port, and a modulation port; a second periodic source providing a second periodic modulation signal to the modulation port of the second optical modulator; and an optical waveguide having a length L connecting the second input/output port of the first optical modulator to the first input/output port of the second optical modulator; wherein the phase difference between the first and second periodic phase modulation signals is $\pi/2$, and wherein in use the length L of the optical waveguide causes a phase delay of $\pi/2$ on any optical signal traversing the optical waveguide.

BRIEF DESCRIPTION OF THE DRAWINGS

In order to better understand various exemplary embodiments, reference is made to the accompanying drawings, wherein.

DETAILED DESCRIPTION

Figure 1:
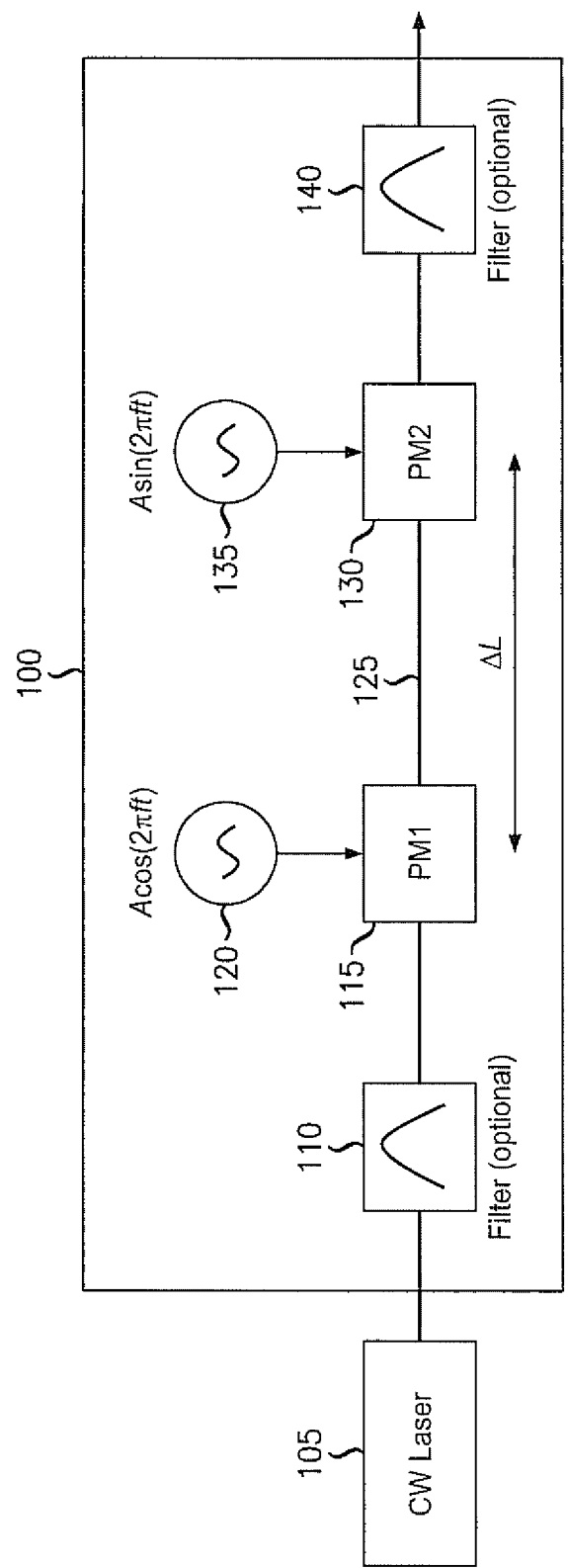
FIG. 1 illustrates an embodiment of an optical isolator for use in an integrated optical circuit.

Referring now to the drawings, in which like numerals refer to like components or steps, there are disclosed broad aspects of various exemplary embodiments.

FIG. 1 illustrates an embodiment of an optical isolator 100 for use in an integrated optical circuit. The optical isolator 100 provides optical isolation to the CW laser 105. The optical isolator includes a first optical filter 110, a first phase modulator 115, a first phase modulation signal 120, an optical waveguide 125, a second phase modulator 130, a second phase modulation signal 135, and a second optical filter 140.

The CW laser 105 may be any typical continuous wave laser source. It may be made of any materials that lend themselves to the manufacture of integrated optical circuits. It may be desired in many applications for the CW laser 105 to have a narrow line width, for example, 100 MHz.

The first optical filter 110 may be an optical bandpass filter. The first optical filter 110 may be implemented in any manner as would be known to one of skill in the art, for example, a Bragg grating or ring resonator. The first optical filter 110 may have a bandwidth centered on the carrier frequency of the CW laser and may have a bandwidth sufficient to reject any wideband artifacts that result from the first and second phase modulators 115, 130.

The first phase modulator 115 is a bi-directional optical phase modulator having at least two input/output ports. The first phase modulator 115 modulates an optical signal travelling in either direction between the input/output ports of the first phase modulator 115. The first phase modulator 115 may also have a modulation port that receives a modulation signal that will be used to phase modulate an optical signal passing through the first phase modulator 115. The first phase modulator 115 may be any type of phase modulator that may be implemented as part of an integrated optical circuit.

The first phase modulation signal 120 is applied to the first phase modulator 115. The first phase modulation signal 120 may be a periodic signal, for example, a sinusoidal signal described by $A\cos(\omega t)$. Accordingly, the phase of the optical signal passing through the first phase modulator will vary according to the function $A\cos(\omega t)$.

The optical waveguide 125 connects the first phase modulator 115 to the second phase modulator 130. The optical waveguide has a length L, where L is defined from approximately the center of the first modulator to approximately the center of the second modulator. The length L corresponds to a specific time delay $\Delta T$, where $L=v_g\Delta T$, $v_g$ is the group velocity in the waveguide, and $\Delta T$ satisfies $\omega\Delta T=\pi/2$. Accordingly, the optical waveguide 125 will cause a $\pi/2$ phase shift in an optical signal having a frequency $\omega$ travelling through it.

The second phase modulator 130 is a bi-directional optical phase modulator having at least two input/output ports. The second phase modulator 130 modulates an optical signal travelling in either direction between the input/output ports of the second phase modulator 130. The second phase modulator 130 may also have a modulation port that receives a modulation signal that will be used to phase modulate an optical signal passing through the second phase modulator 130. The second phase modulator 130 may be any type of phase modulator that may be implemented as part of an integrated optical circuit.

The second phase modulation signal 135 is applied to the second phase modulator 130. The second phase modulation signal 135 may be a periodic signal, for example, a sinusoidal signal described by $A\sin(\omega t)$, where $\omega=2\pi f$. Accordingly, the phase of the optical signal passing through the first phase modulator will vary according to the function $A\sin(\omega t)$. Alternatively, the first and second phase modulation signals 120, 135 may be sinusoidal functions or any other periodic function having the same amplitude and frequency with a phase difference of $\pi/2$.

The second optical filter 140 may be an optical bandpass filter. The second optical filter 140 may be implemented in any manner as would be known to one of skill in the art, for example, a Bragg grating or ring resonator. The second optical filter 140 may have a bandwidth centered on the carrier frequency of the CW laser and may have a bandwidth sufficient to reject any wideband artifacts that result from the first and second phase modulators 115, 130.

The operation of the optical isolator 100 will now be described. In the forward direction, the phase modulation applied by the first and second phase modulators 115, 130 on an optical signal output from the CW laser 105 is as follows:

$$A\cos(\omega t)+A\sin(\omega(t-\Delta T))=A\cos(\omega t)+A\cos(\omega(t-\Delta T)-\pi/2)=A\cos(\omega t)+A\cos(\omega t-\pi)=0$$

Thus there is no net modulation. In the reverse direction, the net phase modulation applied by the first and second phase modulators 115, 130 is as follows:

$$A\sin(\omega t)+A\cos(\omega(t-\Delta T))=A\cos(\omega t-\pi/2)+A\cos(\omega t-\pi/2)=2A\cos(\omega t-\pi/2)$$

If A is chosen such that the center carrier is suppressed, the sidebands may be filtered out by the first optical filter 110 or by the laser cavity in the CW laser 105. In order to have the carrier frequency suppressed, the following Bessel function must be solved:

$$J_0(2A)=0.$$

Thus, when A is approximately 1.2 the carrier frequency will be suppressed. Further, because the first-order Bessel function has multiple zeros, there are additional greater values of A that will also satisfy the relationship. Thus the reverse propagating energy may be displaced by +/−f or more in frequency. One may use the optical filter 110 to eliminate this energy or depend on the laser cavity filtering to remove this energy. The optical filter 100 may be centered approximately about the carrier frequency of the CW laser and have a bandwidth of approximately 2f or less. Accordingly, this configuration works as an isolator for a CW signal.

Figure 2:
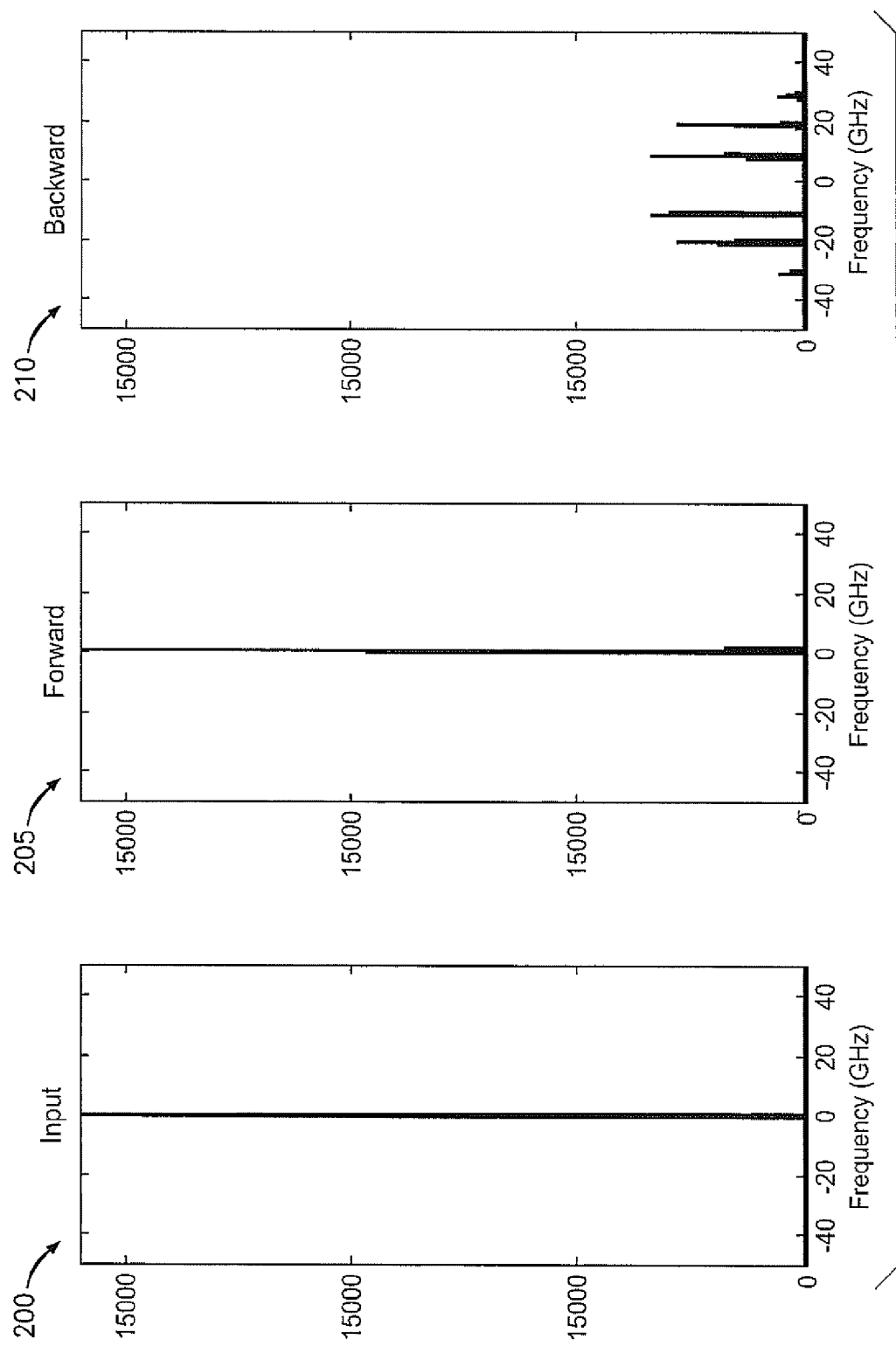
FIG. 2 illustrates plots showing the optical signal at various points in the optical isolator.

FIG. 2 illustrates plots of a simulation showing the optical signal at various points in the optical isolator 100. The input is the CW laser signal and is shown at the left. The center plot shows the signal after passing forward through the two modulators—there is no change. The right plot shows the signal after passing backward through the two modulators as may occur when there are reflections—the carrier signal has been removed, and the energy has been spread to other frequencies.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be effected while remaining within the spirit and scope of the invention. Accordingly, the foregoing disclosure, description, and figures are for illustrative purposes only and do not in any way limit the invention, which is defined only by the claims.

What is claimed is:

1. An optical isolator for use in an integrated optical circuit comprising:
   a first optical modulator configured to provide a first periodic phase modulation on an input optical signal;
   a second optical modulator configured to provide a second periodic phase modulation on the modulated optical signal; and
   an optical waveguide having a length L connecting the first optical modulator to the second optical modulator;
   wherein the phase difference between the first and second periodic phase modulation is $\pi/2$, and
   wherein in use the length L of the optical waveguide causes a phase delay of $\pi/2$ on an optical signal traversing the optical waveguide.

2. The optical isolator of claim 1, further comprising a first optical bandpass filter connected to the first phase modulator.

3. The optical isolator of claim 2, further comprising a second optical bandpass filter connected to the second phase modulator.

4. The optical isolator of claim 2, wherein the first optical bandpass filter has a bandwidth of less than approximately 2 f where f is a frequency of the first and second periodic modulations.

5. The optical isolator of claim 1, wherein $L=v_g\Delta T$, where $v_g$ is the group velocity in the waveguide, and $\Delta T$ satisfies $\omega\Delta T=\pi/2$ where $\omega$ is a frequency of the first and second periodic modulations.

6. The optical isolator of claim 1, wherein the first periodic phase modulation is $A\cos(\omega t)$ and the second periodic phase modulation is $A\sin(\omega t)$.

7. The optical insulator of claim 6, wherein A substantially satisfies the relationship $J_0(2A)=0$.

8. The optical isolator of claim 1, wherein the optical isolator is configured to isolate the output of a continuous wave laser.

9. A method of isolating the output of a laser source comprising:
   optically phase modulating the output of the laser source with a first periodic phase modulation;
   transmitting the optically phase modulated signal on an optical waveguide that phase delays the optically phase modulated signal by $\pi/2$;
   optically phase modulating the transmitted optically phase modulated signal with a second periodic phase modulation wherein the phase difference between the first and second periodic phase modulation is $\pi/2$.

10. The method of claim 9, further comprising optically filtering the input optical signal.

11. The method of claim 10, wherein optically filtering the input optical signal has a bandwidth of less than approximately 2 f where f is a frequency of the first and second periodic modulations.

12. The method of claim 10, further comprising after optically phase modulating the transmitted optically phase modulated signal, optically filtering the resulting optical signal.

13. The method of claim 9, further comprising after optically phase modulating the transmitted optically phase modulated signal, optically filtering the resulting optical signal.

14. The method of claim 13, wherein optically filtering the resulting optical signal has a bandwidth of less than approximately 2 f where f is a frequency of the first and second periodic modulations.

15. The method of claim 9, wherein the first periodic phase modulation is A $\cos(\omega t)$ and the second periodic phase modulation is A $\sin(\omega t)$.

16. The method of claim 15, wherein A substantially satisfies the relationship $J_0(2A)=0$.

17. An optical isolator for use in an integrated optical circuit comprising:
   a first optical modulator having a first input/output port, a second input/output port, and a modulation port;
   a first periodic source providing a first periodic modulation signal to the modulation port of the first optical modulator;
   a second optical modulator having a first input/output port, a second input/output port, and a modulation port;
   a second periodic source providing a second periodic modulation signal to the modulation port of the second optical modulator; and
   an optical waveguide having a length L connecting the second input/output port of the first optical modulator to the first input/output port of the second optical modulator;
   wherein the phase difference between the first and second periodic phase modulation signals is $\pi/2$, and
   wherein in use the length L of the optical waveguide causes a phase delay of $\pi/2$ on an optical signal traversing the optical waveguide.

18. The optical isolator of claim 17, further comprising a first optical bandpass filter connected to the first input/output port of the first phase modulator.

19. The optical isolator of claim 18, further comprising a second optical bandpass filter connected to the second phase modulator.

20. The optical isolator of claim 17, wherein the first periodic phase modulation is A $\cos(\omega t)$ and the second periodic phase modulation is A $\sin(\omega t)$.

* * * * *